(No Model.)
A. E. GREEN.
HARROW.
No. 284,837. Patented Sept. 11, 1883.
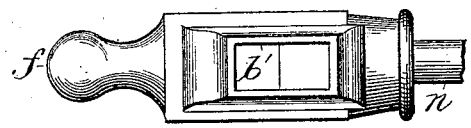
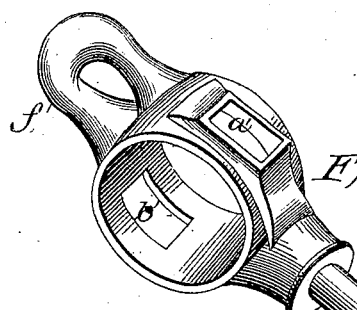
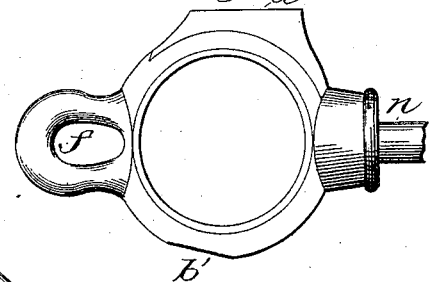
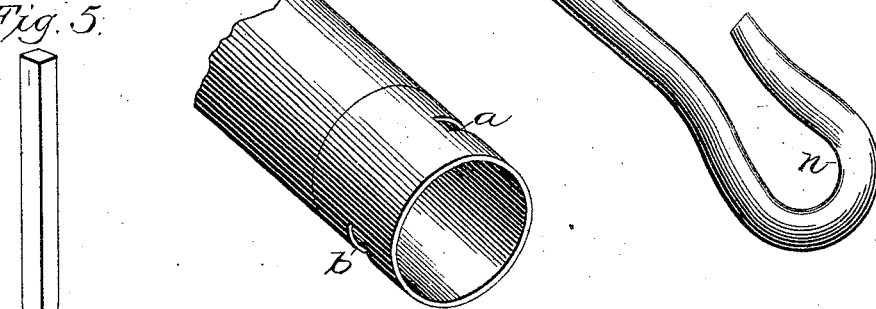
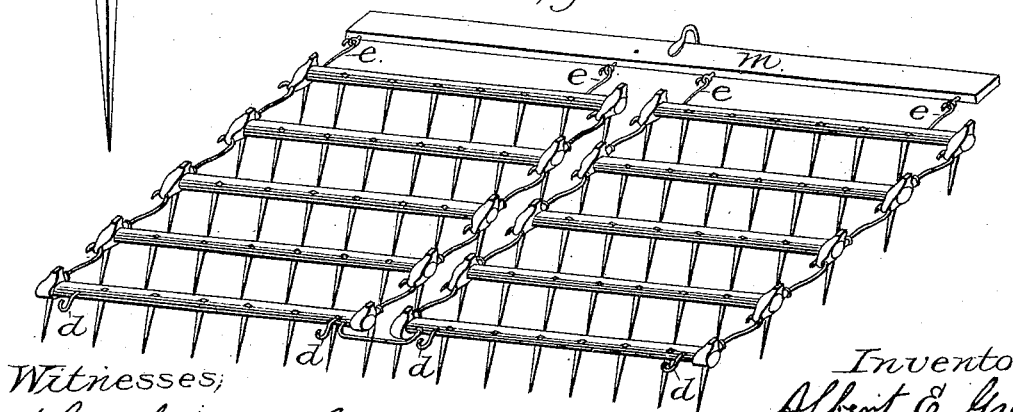
Witnesses:
Luther B. Green
Edwin T. Cass
Inventor:
Albert E. Green
N. PETERS, Photo-Lithographer, Washington, D. C.

UNITED STATES PATENT OFFICE.

ALBERT E. GREEN, OF HEBRON, WISCONSIN.

HARROW.

SPECIFICATION forming part of Letters Patent No. 284,837, dated September 11, 1883.

Application filed August 14, 1882. (No model.)

*To all whom it may concern:*

Be it known that I, ALBERT E. GREEN, a citizen of the United States, residing at Hebron, in the county of Jefferson and State of Wisconsin, have invented a new and useful device for coupling together and holding the beams of a land-harrow, through which the teeth pass, in such a position that a harrow of perpendicular or slanting teeth may be readily had, and without trouble and in a moment of time, of which the following is a specification.

The objects of my invention are, first, to afford easy facilities for adjusting the beams of a land-harrow, through which the teeth pass and in which they are held, so that the teeth will be vertical or slanting with the ground, as desired; and, second, to couple together and hold rigidly the beams of a land-harrow in either of the positions desired while the harrow is in use. I attain these objects by the mechanism illustrated in the accompanying drawings, in which—

Figure 1 is a side view of a malleable-iron shackle with a large round hole through it, and on three sides of which are projections, through one of which there is a round hole, the hook end of the shackle being broken away. Fig. 2 is a top view of the same malleable-iron shackle with a slot or mortise passing vertically through it. Fig. 3 is a perspective view of the same malleable-iron shackle with a wrought-iron hook cast into and extending from one of the projections. Fig. 4 is a view of the end of a round harrow-beam having a square hole through it, through which the teeth of the harrow pass. Fig. 5 represents a wrought-iron harrow-tooth made square, so as to pass through the square hole in the end of the beam; and Fig. 6 is a perspective top view of a double land-harrow complete, coupled together and held in position by the devices represented in Figs. 3, 4, and 5, and attached to which is a draw-bar, *m*, so that when the harrow is drawn by hitching to the draw-bar *m*, as represented in said figures, the teeth will stand slanting, but when drawn from the other end the teeth will be vertical.

To accomplish the object I insert the end of the harrow-beam with the square hole through it, *a* and *b*, as shown in Fig. 4, into the large round hole in the malleable-iron shackle, Fig. 3, far enough for the hole *a* and *b* in the end of the beam to be directly opposite to the elongated slots *a'* and *b'* in the shackle, and then by placing the iron harrow-tooth, Fig. 5, through the slot *a'* in the shackle and the square hole *a* and *b* in the end of the beam and through the slot *b'* in the shackle a pivot is formed, on which the beam will turn far enough to allow all the teeth in the beam to stand slanting with the ground when the harrow is drawn from the hook end of the shackle; but when drawn from the other end the teeth will stand perpendicular with the ground. This rotary motion of the harrow-beam is produced by making the slots *a'* and *b'*, which pass vertically through the shackle, from one-half to three-fourths of one inch longer toward the hook end on the top side and toward the other end on the bottom side of the shackle, so that the tooth which passes through the slots and the end of the beam inserted into the large round hole in the shackle will allow the beam to rotate in the hole far enough for the teeth to have the desired slant back when the harrow is drawn from the hook end of the shackle, and when drawn from the other end will allow the beam to rotate the other way until the teeth will stand vertical with the ground.

The shackles are coupled together by inserting the hook *n*, as shown in Fig. 3, into the hole *f*, as shown in Figs. 1 and 3, and by putting the desired number of beams filled with teeth into the shackles, as above described, so coupled together, and attaching the draw-bar *m*, as shown in Fig. 6, a complete flexible land-harrow is formed.

Having described my invention, what I claim as new, and desire to secure by Letters Patent, is—

In combination with the tooth-beams of a harrow, the coupling or shackle having an eye, *f*, at one end, and a hook, *n*, at the other, and having the enlarged intermediate portion with a transverse circular opening and vertical elongated slots *a' b'*, and the harrow-tooth inserted through said slots and the end of the tooth-beam, substantially as described, whereby the tooth will slant backward when the harrow is drawn in one direction and will stand erect when the draft is reversed, as set forth.

ALBERT E. GREEN.

Witnesses:
 H. E. PAGE,
 EVA PAGE.